(12) United States Patent
Fukuda et al.

(10) Patent No.: US 10,394,675 B2
(45) Date of Patent: Aug. 27, 2019

(54) VEHICLE CONTROL DEVICE

(71) Applicant: HITACHI AUTOMOTIVE SYSTEMS, LTD., Ibaraki (JP)

(72) Inventors: Takeshi Fukuda, Tokyo (JP); Fumio Narisawa, Tokyo (JP); Tomohito Ebina, Hitachinaka (JP); Hiroaki Komatsu, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 156 days.

(21) Appl. No.: 15/541,603

(22) PCT Filed: Jan. 12, 2016

(86) PCT No.: PCT/JP2016/050604
§ 371 (c)(1),
(2) Date: Jul. 5, 2017

(87) PCT Pub. No.: WO2016/117402
PCT Pub. Date: Jul. 28, 2016

(65) Prior Publication Data
US 2017/0357560 A1    Dec. 14, 2017

(30) Foreign Application Priority Data

Jan. 21, 2015 (JP) .................. 2015-009051

(51) Int. Cl.
*G06F 11/00* (2006.01)
*G06F 11/22* (2006.01)
(Continued)

(52) U.S. Cl.
CPC .............. *G06F 11/22* (2013.01); *G06F 9/445* (2013.01); *G06F 9/4405* (2013.01); *G06F 11/14* (2013.01);
(Continued)

(58) Field of Classification Search
CPC ...................................................... G06F 11/22
(Continued)

(56) References Cited

U.S. PATENT DOCUMENTS 6,854,081 B1    2/2005 Suzuki
2005/0050387 A1    3/2005 Mariani et al.
(Continued)

FOREIGN PATENT DOCUMENTS

JP    2000-040069 A    2/2000
JP    2006-260568 A    9/2006
(Continued)

OTHER PUBLICATIONS

International Search Report for WO 2016/117402 A1, dated Apr. 26, 2016.
(Continued)

*Primary Examiner* — Dieu Minh T Le
(74) *Attorney, Agent, or Firm* — Volpe and Koenig, P.C.

(57) ABSTRACT

The present invention provides a vehicle control device with which, even when an abnormality is detected in a core in a multi-core processor, it is possible to reduce the time needed until the core in which the abnormality is detected restarts and re-executes application software. The present invention is characterized by being provided with: a diagnostic means for carrying out a diagnostic process when starting a processor core, the diagnostic process including hardware diagnosis performed by hardware and software diagnosis performed using software after the hardware diagnosis; and a diagnostic process information change processing means for changing the method for executing the diagnostic process when all of the processor cores are started and when one of the processor cores is restarted.

4 Claims, 6 Drawing Sheets

(51) Int. Cl.
    *G06F 9/445*     (2018.01)
    *G06F 11/14*     (2006.01)
    *G06F 9/4401*     (2018.01)

(52) U.S. Cl.
    CPC ...... *G06F 11/2242* (2013.01); *G06F 11/1417* (2013.01)

(58) Field of Classification Search
    USPC .................. 714/36, 37, 39, 40, 47.1, 46
    See application file for complete search history.

(56) References Cited

U.S. PATENT DOCUMENTS

| | | | | |
|---|---|---|---|---|
| 2010/0138693 | A1* | 6/2010 | Ohkawa | G06F 11/1695 714/25 |
| 2016/0378103 | A1* | 12/2016 | Malinowski | H04L 63/1408 701/29.2 |

FOREIGN PATENT DOCUMENTS

| | | |
|---|---|---|
| JP | 2007-154050 A | 6/2007 |
| JP | 2008-123031 A | 5/2008 |
| JP | 2010-170355 A | 8/2010 |
| JP | 2012-074057 A | 4/2012 |
| JP | 2014-191389 A | 10/2014 |

OTHER PUBLICATIONS

Extended European Search Report dated Aug. 23, 2018 for the European Patent Application No. 16740009.2.
Communication Pursuant to Article 94(3) EPC dated Jun. 14, 2019 for European Patent Application No. 16740009.2.

* cited by examiner

(a) ABNORMALITY DETECTION OF CORE 1

(b) ALTERNATIVE PROCESSING OF ADAS FUNCTION (c) RESTART OF CORE 1

VEHICLE CONTROL DEVICE

TECHNICAL FIELD

The present invention relates to a vehicle control device that controls a system with a multi-core processor, the system including necessary functions over a wide range and being a large-scale system including a plurality of pieces of hardware and a plurality of pieces of software combined, in transport machinery, such as a motor vehicle, a railway, or an elevator.

BACKGROUND ART

A built-in control device that controls an object to be controlled with so-called built-in software, is used in a motor vehicle, an elevator, or construction machinery. The built-in software is advantageously capable of achieving flexible and advanced control in comparison to a conventional method with a mechanical mechanism or an electric circuit.

Electronic control unit (ECU) integration including functions that have been conventionally, individually mounted on different ECUs, aggregated on one ECU, has been progressively developed in order to reduce an in-vehicle space and manufacturing costs for such a built-in control device, for example, a vehicle control device. During the progress of the ECU integration, a multi-core processor has been already applied to the vehicle control device because of the plurality of functions required to be processed on the same ECU.

The multi-core processor is capable of performing different pieces of processing in parallel with a plurality of cores and additionally is, when a partial core fails, capable of performing alternative processing to application software allocated to the partial core, with another core. Accordingly, it has been known that redundancy of the system can be achieved, and for example, PTL 1 describes the redundancy.

When the failure of the partial core in the multi-core processor is detected, only the core including the failure detected, restarts so that the failed core can be restored with the function of the entire system not being suspended. As a technique of achieving the above, a technique of dynamically changing operation and non-operation for each core in the multi-core processor, has been known, and, for example, PTL 2 describes the technique.

However, the throughput of the entire multi-core processor has an upper limit so that all initial application software is difficult to execute during the restart of the partial core. Accordingly, the core including the failure detected restarts as soon as possible and the allocated application software is executed, preferably.

CITATION LIST

Patent Literature

PTL 1: JP 2007-154050 A
PTL 2: JP 2006-260568 A

SUMMARY OF INVENTION

Technical Problem

Figure 2:
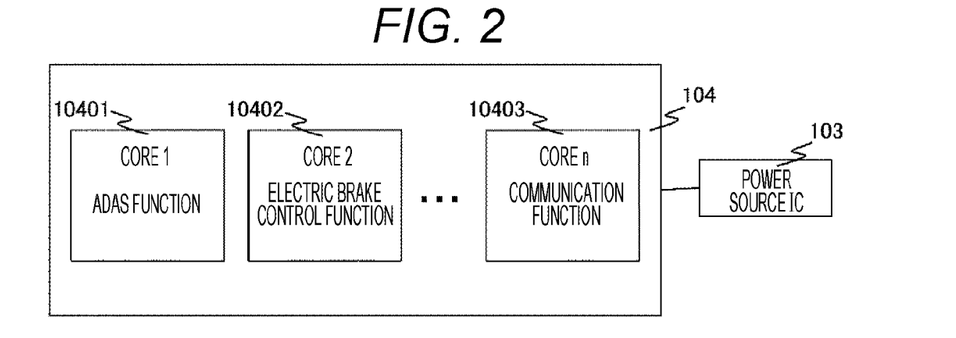
FIG. 2 is a block diagram of specific exemplary parallel processing of functions with a multi-core microcomputer.

FIG. 2 illustrates an example of an in-vehicle function allocated to each core in a multi-core microcomputer. A core 1 performs an advanced driver assistance systems (ADAS) function, and a core 2 and a core n perform an electric brake system and a communication function, respectively, in FIG. 2. In this manner, integration of ECUs is performed with the multi-core processor so that the functions that have been conventionally processed by the individual ECUs, can be processed by one ECU.

Figure 3:
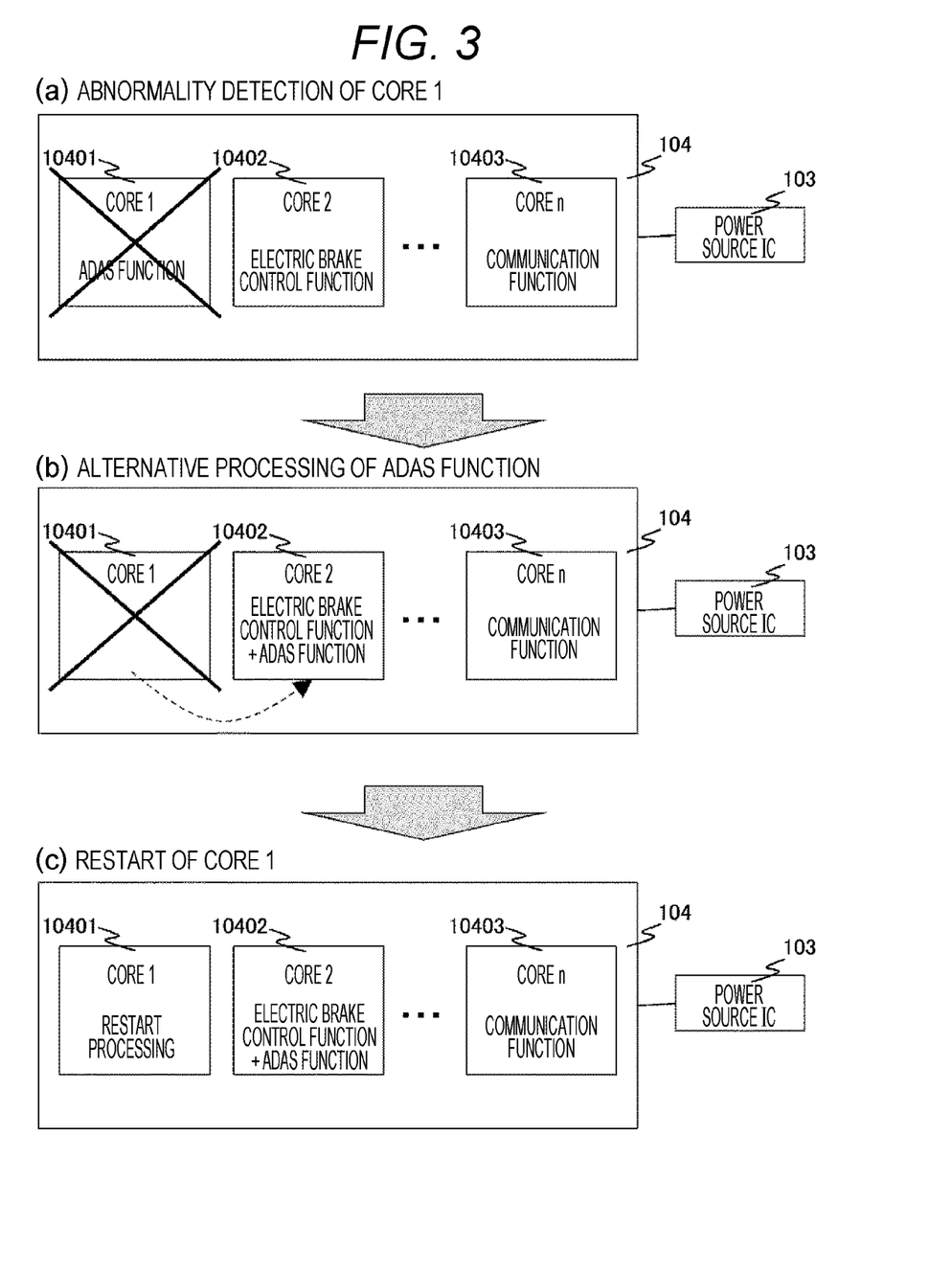
FIGS. 3(a) to 3(c) are block diagrams illustrating a flow of specific processing until a core restarts since an abnormality has been detected in the multi-core microcomputer in a case where a conventional technique has been used.

FIGS. 3(a) to 3(c) illustrate a procedure until the core restarts in a case where a failure of the core 1 has been detected in the multi-core microcomputer. FIG. 3(a) is a block diagram of the core 1 including an abnormality detected. FIG. 3(b) is a block diagram of alternative processing being performed to the ADAS function that has been performed by the core 1, by the core 2, based on PTL 1. FIG. 3(c) is a block diagram of only the core 1 restarting, based on PTL 2.

In this manner, even when the abnormality is detected in the partial core, using the multi-core processor can continue an operation with the function of the entire system not being suspended, and can restore the original state.

In FIGS. 3(a), 3(b), and 3(c), the core 2 performs the ADAS function of the core 1 so that the throughput of the core 2 considerably increases. Accordingly, when the abnormality is detected in the core, the core 1 preferably restarts at high speed as much as possible so as to be restored in the original state. However, restart processing of the core has not been considered in the conventional techniques.

As described above, an object of the present invention is to provide a vehicle control device capable of, when an abnormality is detected in a partial core on a multi-core processor, shortening time necessary until application software is re-executed since a restart of the core including the abnormality detected.

Solution to Problem

In order to achieve the object, the present invention includes a method of performing individual pieces of diagnostic processing when all processor cores start and when a partial core in all the processor cores restarts, and performs a partial-processor-core-restart diagnostic processing method when only the partial processor core restarts, so as to shorten time necessary for restarting the partial processor core. Particularly, in the diagnostic processing when the partial processor core restarts, another processor core performs software diagnosis before the processor core that restarts performs the software diagnosis, so that the time necessary for the restart shortens.

Advantageous Effects of Invention

According to the present invention, when only the partial core in the multi-core processor restarts, the time necessary until the application software is executed since the restart of the core, can shorten.

DESCRIPTION OF EMBODIMENTS

One embodiment of the present invention will be described below with reference to the drawings.

Figure 1:
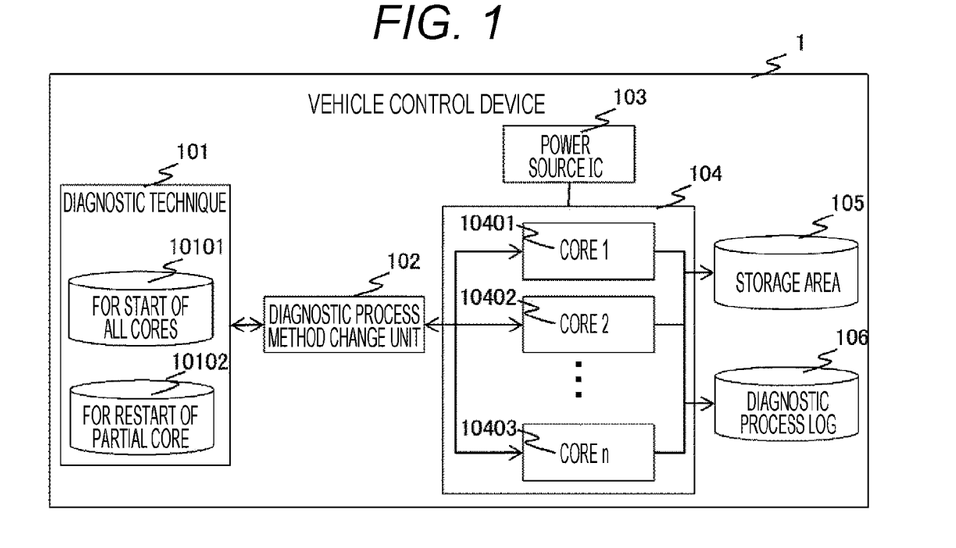
FIG. 1 is a block diagram of a system configuration of a vehicle control device according to one embodiment of the present invention.

FIG. 1 is a block diagram of a system configuration of a vehicle control device according to the one embodiment of the present invention. The vehicle control device 1 includes a diagnostic technique 101, a diagnostic process method change unit 102, a power source IC 103, a multi-core processor 104, a storage area 105, and a diagnostic process log 106.

Here, the multi-core processor 104 includes a plurality of cores 10401, 10402, and 10403.

Here, the diagnostic technique 101 includes an all-core-start diagnostic technique 10101 being a diagnostic technique used in starting all the cores and a partial-core-restart diagnostic technique 10102 being a diagnostic technique used in restarting a partial core. In starting the processor cores, the diagnostic process method change unit 102 selects the all-core-start diagnostic technique 10101 when all the cores start and selects the partial-core-restart diagnostic technique 10102 when the partial core restarts. Accordingly, time necessary until application software is executed since the restart of the partial core, shortens.

Figure 4:
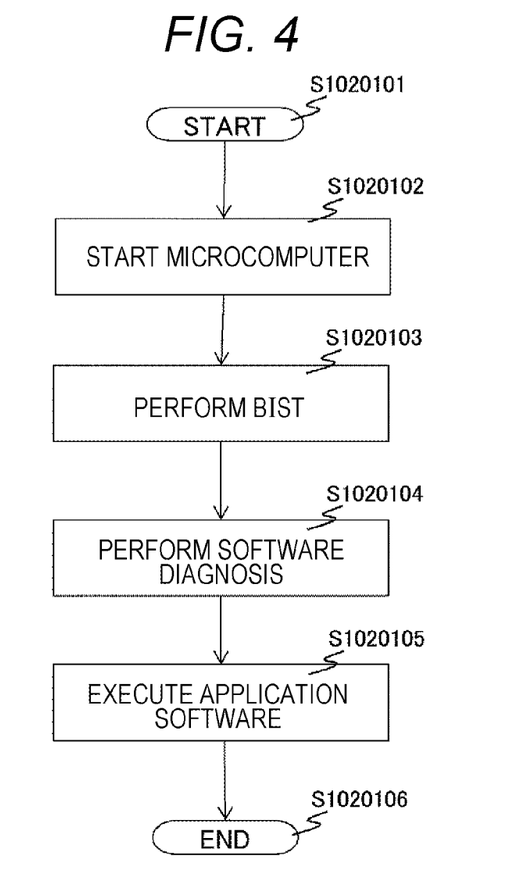
FIG. 4 is a flow chart of a typical example until application software is executed since a start of the microcomputer.

FIG. 4 is a flow chart of a typical example until the application is executed since a start of the microcomputer. Processing starts at step S1020101. The microcomputer starts at step S1020102. A built-in self-test (BIST) is performed at step S1020103. Diagnosis with software is performed at step S1020104. The application is executed at step S1020105 and then the processing finishes at step S1020106.

As illustrated in FIG. 4, typically when the microcomputer starts, the BIST built in a circuit (hardware) is performed and then the diagnosis with the software is performed.

Here, the software diagnosis described at step S1020104 corresponds to, for example, RAM diagnosis on the storage area 105 using the software. More specifically, the diagnosis writes a fixed value into the storage area 105, and determines whether a result read after the writing is equivalent to the initial fixed value. Accordingly, the diagnosis of whether the storage area 105 normally operates, can be performed. In addition, examples of the software diagnosis include ROM diagnosis using a checksum and diagnosis on an error check and correct (ECC) function by fault injection.

Figure 5:
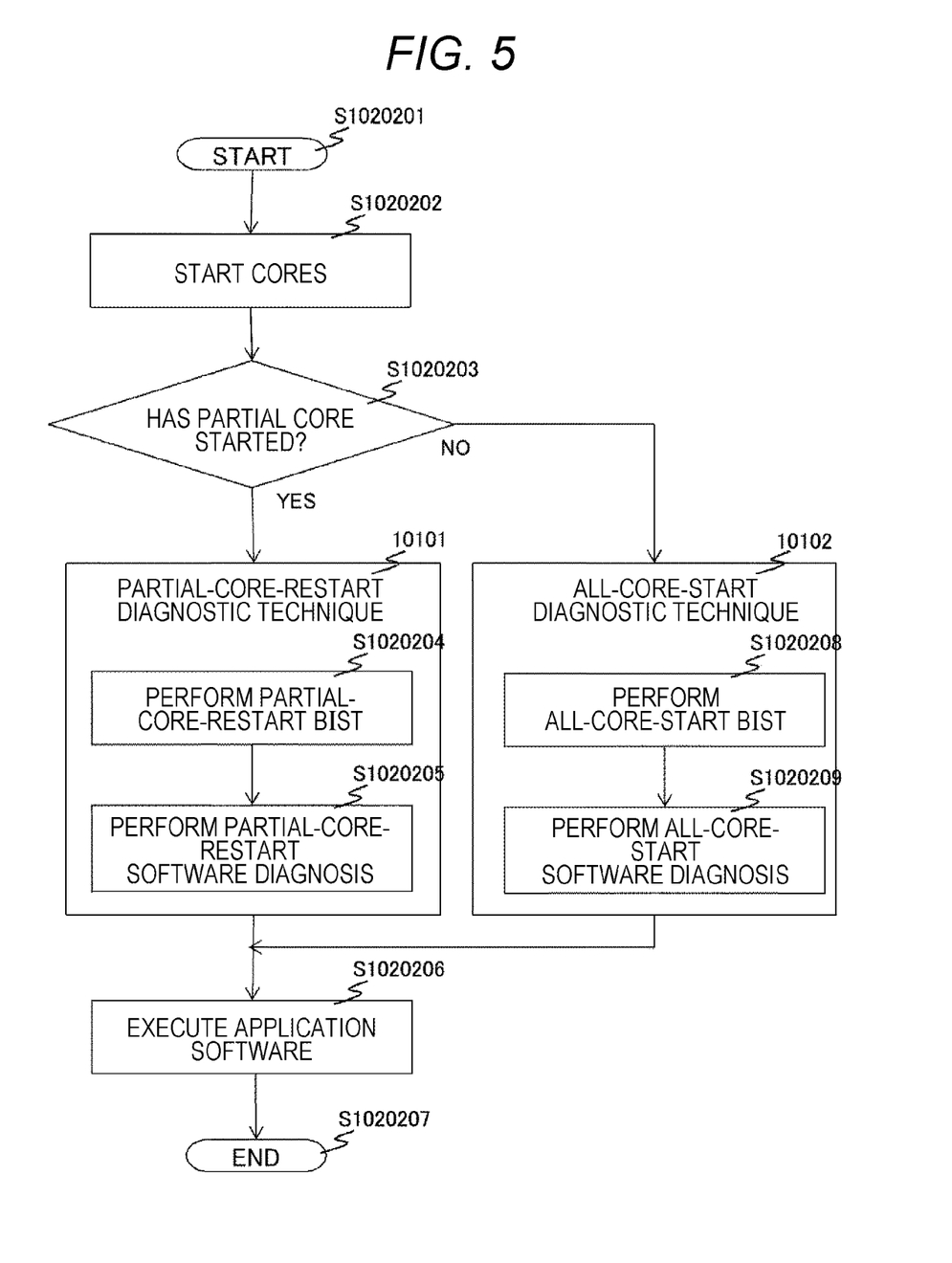
FIG. 5 is a flow chart of a specific example until the application is executed since a start of processor cores, in a proposed technique.

FIG. 5 is a flow chart of a specific example until the application is executed since a start of the processor cores in the proposed technique, and processing starts at step S1020201. The core starts at step S1020202. It is determined whether only a partial processor core has started, at step S1020203. When Yes is acquired, namely, only the partial processor core has started, the processing proceeds to step S1020204 and then the partial-core-restart diagnostic technique 10101 is performed. A partial-core-start BIST is performed at step S1020204. Partial-core-restart software diagnosis is performed at step S1020205. The application software is executed at step S1020206 and the processing finishes at step S1020207. Meanwhile, when No is acquired at step S1020203, namely, all the processor cores have started, the processing proceeds to step S1020208 and the all-core-start diagnostic technique 10102 is performed. An all-core-start BIST is performed at step S1020208. All-core-start software diagnosis is performed at step S1020209. The application software is executed at step S1020206, and the processing finishes at step S1020207.

Figure 6:
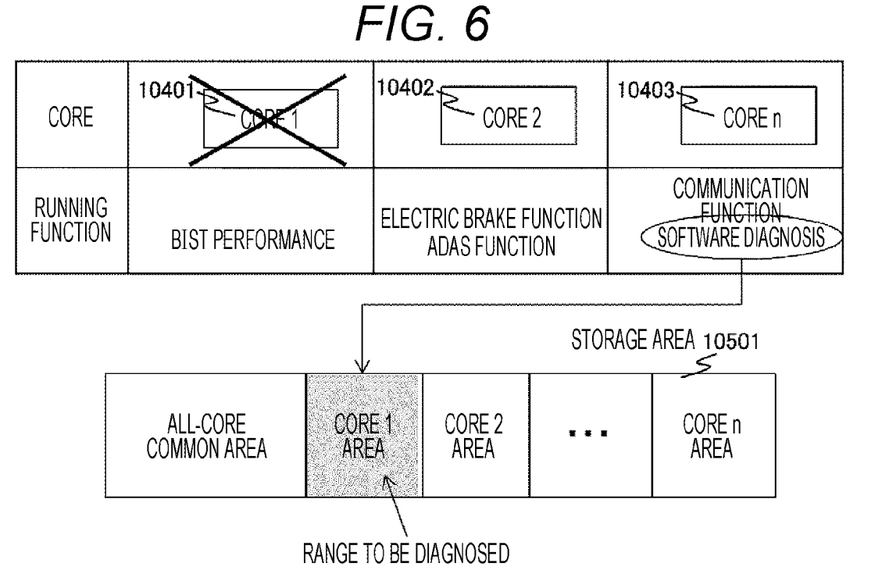
FIG. 6 is a block diagram of a specific example of software diagnosis when a partial core restarts, in the proposed technique.

FIG. 6 illustrates a specific example of the software diagnosis in restarting the partial core when the proposed technique has been used. FIG. 6 illustrates a state where an abnormality has been detected in the core 1 and the partial-core-restart diagnostic technique 10101 has been performed. In the proposed technique, the core n previously performs the software diagnosis and a core 1 storage area being a range to be diagnosed is diagnosed during the core 1 including the abnormality detected, being performed with the BIST, so that time until the core 1 executes the application software can shorten.

Figure 7:
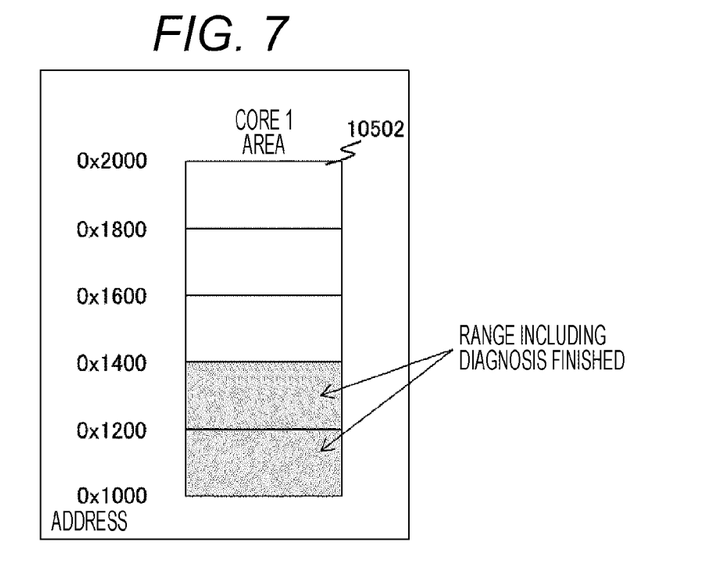
FIG. 7 is a block diagram of a specific example of software diagnosis progress in a storage area in the proposed technique.

FIG. 7 illustrates progress management when the software diagnosis is performed to a storage area 10502. As illustrated in FIG. 7, as a method of managing the progress of the software diagnosis, storing and managing an address value in a range including the diagnosis finished, can resume the software diagnosis from the initial position even when work is changed during the diagnosis.

Figure 8:
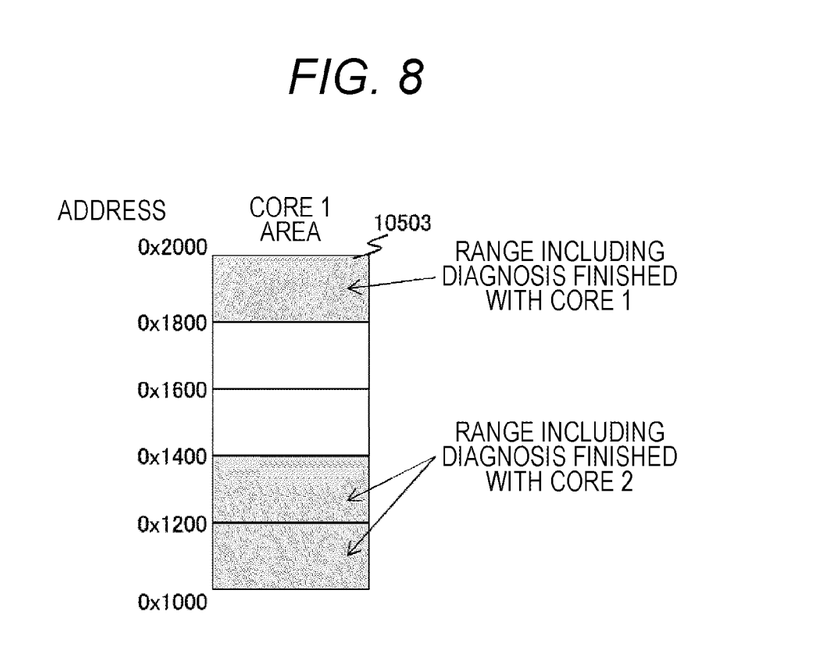
FIG. 8 is a block diagram of a specific example of software diagnosis progress in a storage area when a plurality of cores cooperates with each other in the proposed technique.

FIG. 8 illustrates software diagnosis progress of a storage area 10503 when the plurality of cores cooperates with each other. As illustrated in FIG. 8, when diagnosis is performed with two cores, one core starts the diagnosis from a lower address value and the other core starts the diagnosis from a higher address value so that time necessary for the diagnosis can further shorten.

REFERENCE SIGNS LIST 1 vehicle control device
101 diagnostic means
10101 all-core-start diagnostic means
10102 partial-core-restart diagnostic means
102 diagnostic process method change unit
103 power source IC
104 multi-core processor
10401, 10402, 10403 processor core
105, 10501, 10502, 10503 storage area
106 diagnostic process log

The invention claimed is:

1. A vehicle control device comprising:
a plurality of processing cores that include a first processing core and a second processing core, wherein each processing core is assigned one or more in-vehicle functions so that the first processing core is assigned a first in-vehicle function and the second processing core is assigned a second in-vehicle function; and
a storage area that is communicatively coupled to the plurality of processing cores, wherein the storage area includes a plurality of portions that are each assigned to a respective processing core;
wherein each respective processing core from the plurality of processing cores is configured to:

detect a fault by performing a hardware diagnosis by the respective processing core when the respective processing core is started, and perform a software diagnosis on the portion of the storage area assigned to the respective processing core after the hardware diagnosis is completed; and wherein, on a condition that the fault is detected in the first processing core, the vehicle control device is configured to:

reassign the first in-vehicle function from the first processing core to the second processing core, wherein the second processing core executes both the first in-vehicle function and the second in-vehicle function, perform the software diagnosis on the portion of the storage area assigned to the first processing core using a third processing core, and restart the first processing core.

2. The vehicle control device according to claim 1, wherein an access right to the portion of the storage area that is allocated to the first processing core is changed in performing the software diagnostic of the storage area.

3. The vehicle control device according to claim 1, further comprising:

a dedicated processor core configured to detect faults in the plurality of processing cores.

4. The vehicle control device according to claim 1, wherein a diagnostic result of the software diagnosis is output as a log.

* * * * *